April 28, 1953  F. V. BELL  2,636,290
AUTOMATIC BLADE CONTROL FOR ROAD GRADERS AND THE LIKE
Filed Feb. 20, 1951  5 Sheets-Sheet 1
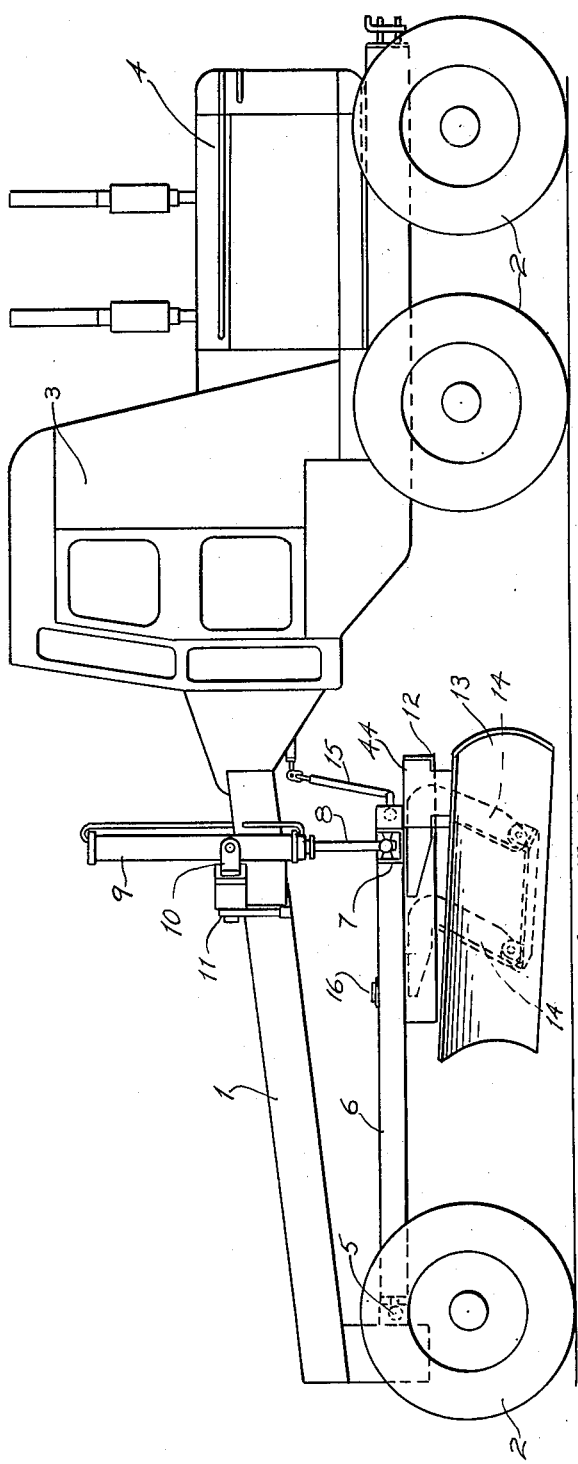
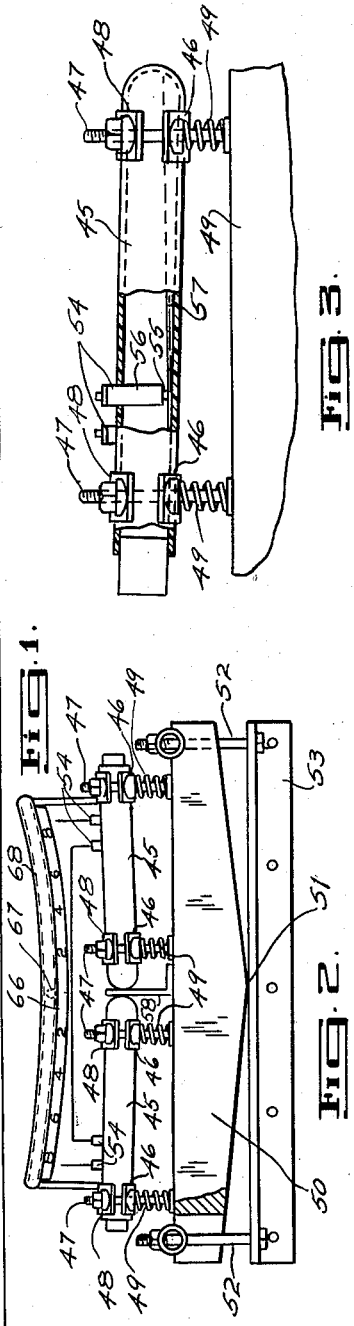
INVENTOR
Frank Victor Bell
By
Douglas S. Johnson
ATTY.

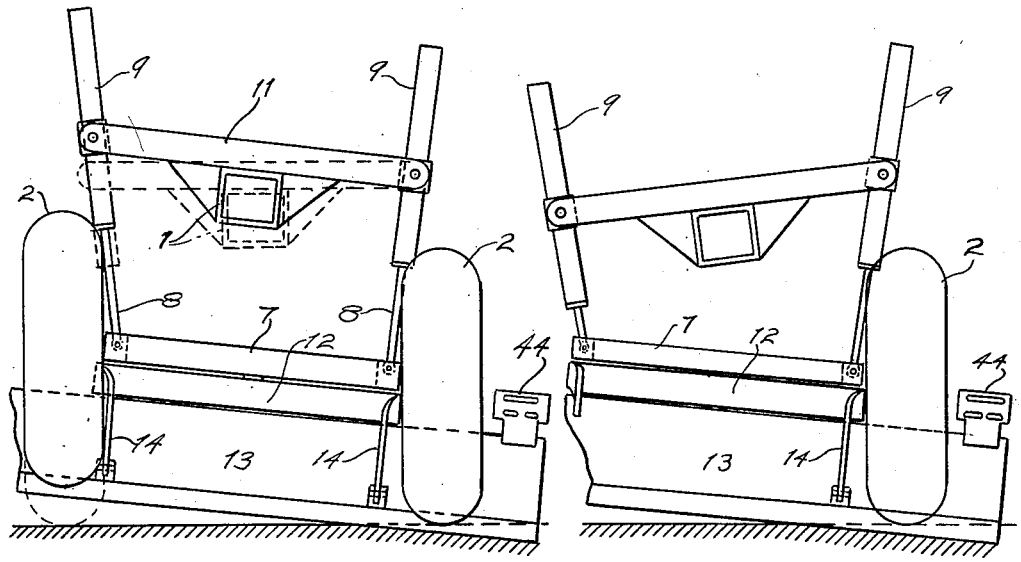
Fig. 4.    Fig. 5.
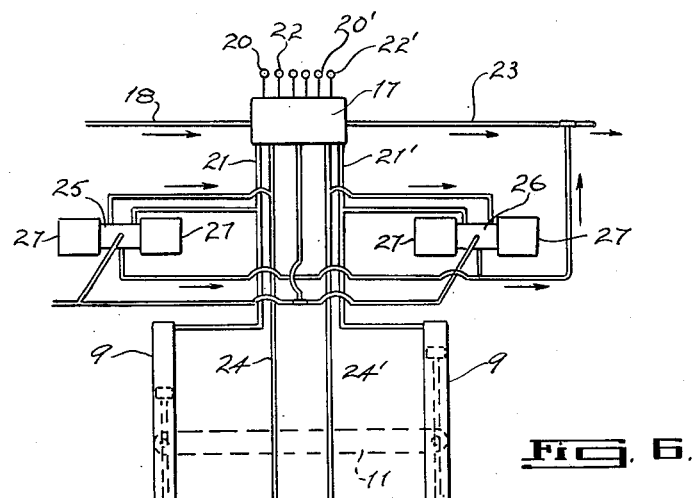
Fig. 6.
INVENTOR
Frank Victor Bell
By Douglas S. Johnson
ATTY.
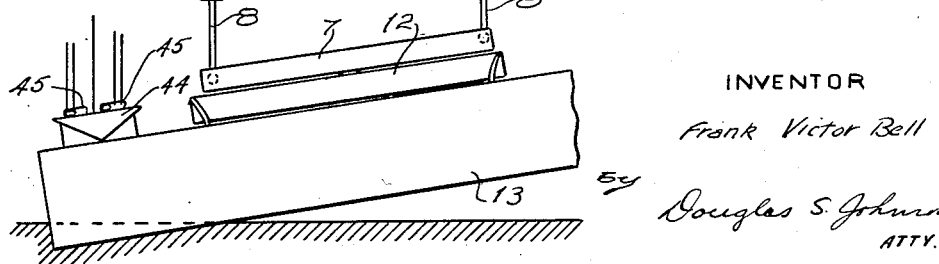

April 28, 1953          F. V. BELL          2,636,290
AUTOMATIC BLADE CONTROL FOR ROAD GRADERS AND THE LIKE
Filed Feb. 20, 1951          5 Sheets-Sheet 3

INVENTOR
Frank Victor Bell
Douglas S. Johnson
ATTY.

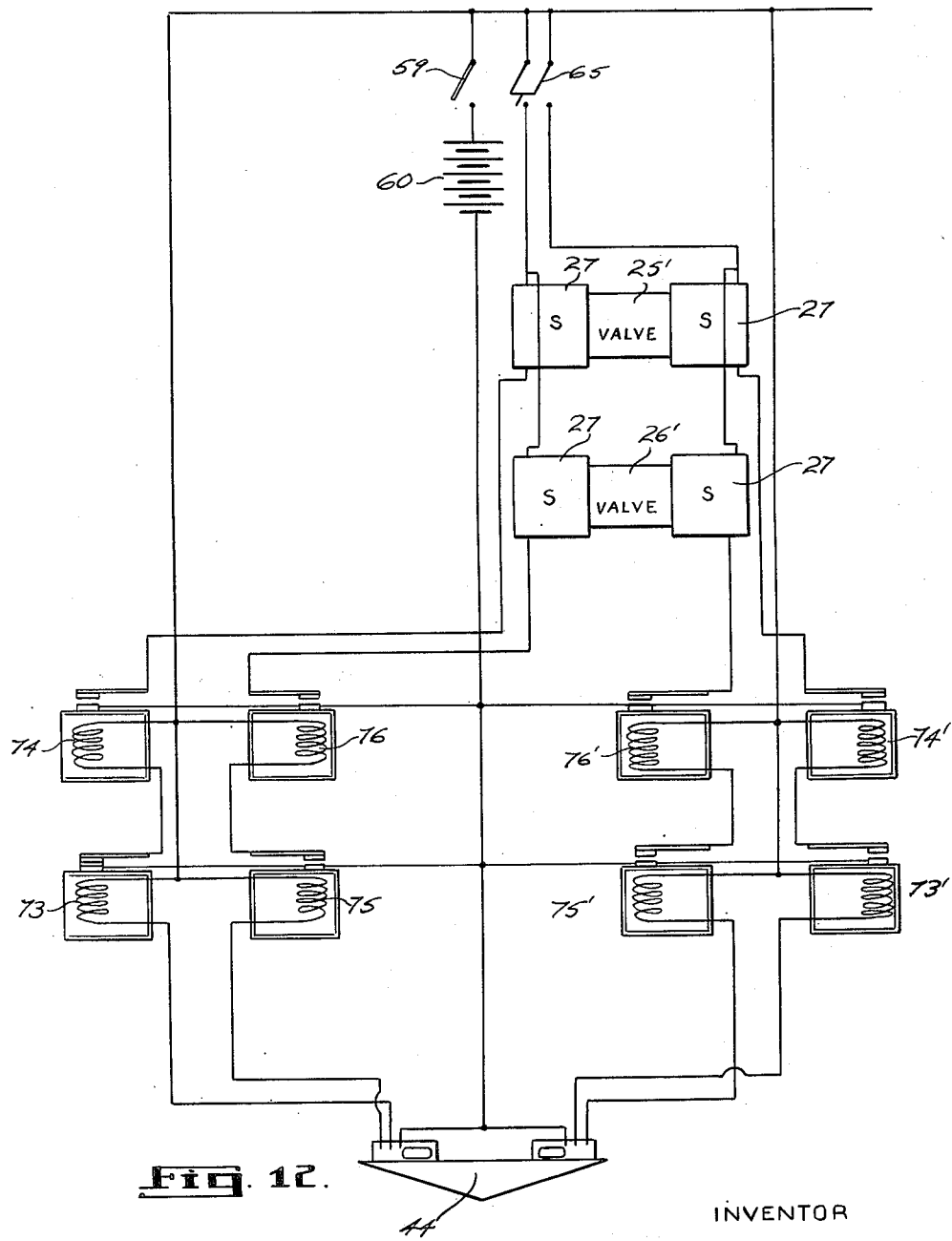

Patented Apr. 28, 1953

2,636,290

UNITED STATES PATENT OFFICE 2,636,290

AUTOMATIC BLADE CONTROL FOR ROAD GRADERS AND THE LIKE

Frank Victor Bell, Stoney Creek, Ontario, Canada

Application February 20, 1951, Serial No. 211,873

9 Claims. (Cl. 37—156)

This invention relates to improvements in grading equipment and more particularly to an automatic blade control for road graders and the like.

The principal object of the invention is to enable the scraper blade or mould board to be automatically held at a desired inclination with a high degree of accuracy independent of rocking of the supporting frame as the grader moves across the surface to be graded to provide more efficient and accurate results in obtaining a desired grading than has previously been possible.

A further important object is to eliminate the constant and arduous vigilance now required by the machine operator in attempting accurate grading, enabling the grader to be successfully and more efficiently operated by relatively inexperienced personnel to provide an important saving in operating costs.

Another important object is to enable rapid adjustment of the blade accurately to the desired angle permitting grading to be carried out rapidly even in relatively uneven terrain.

Still a further object is to provide a rugged yet sensitive control as aforesaid readily adapted to present grading equipment and relatively easy and inexpensive to install.

The principal feature of the invention consists in providing a grading machine equipped with power controls for raising, lowering and inclining the blades with a control device mounted on the blade and responsive to variations in blade incline, and arranging the control device to energize a control system adapted to operate the blade power controls in a manner to effect blade movement in a direction to counteract change of blade angle.

A further important feature consists in the provision of a control device and control system as aforesaid affording a varied response to different degrees of magnitude of blade tilt from a desired grading angle to first provide rapid blade movement towards grading angle and then refined blade movement to assume the correct grading angle with a high degree of accuracy, permitting rapid and accurate grading even in relatively uneven terrain.

Still another feature resides in providing for the ordinary manual blade operation controls to override the automatic control when large blade movement is desired whereby the blade movement may be manually controlled without regard or attention to the automatic control.

These and other objects and features will become apparent from the following description taken in conjunction with the accompanying drawings in which Figure 1 is an elevational view of a road grader equipped for automatic blade-levelling control according to the present invention.

Figure 2 is an elevational detail of the control device mounted on the scraper blade or mould board.

Figure 3 is an enlarged detail partly in elevation and partly in section of one of the switch units included in the device of Figure 2.

Figure 4 is a part diagrammatic view illustrating the manner in which the blade is supported in desired inclination from the carrying frame.

Figure 5 is a view similar to Figure 4 showing the blade angle maintained while the carrying frame has been rocked to a different position due to the unevenness of the terrain.

Figure 6 is a diagrammatic view illustrating a hydraulic control system of operating the blade according to the invention.

Figure 12 is a schematic wiring diagram of the electrical control circuit used in conjunction with the hydraulic system of Figure 11.

Figure 7:
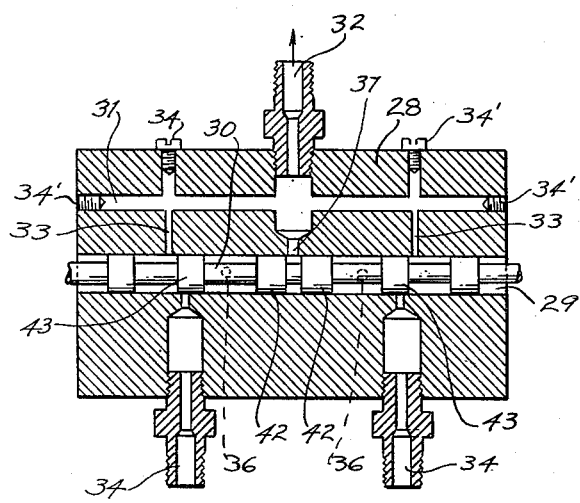
Figure 7 is a longitudinal vertical section through a suitable control valve for use in the hydraulic system of Figure 6.

There are many instances where accuracy of grading is important. For instance, in constructing or maintaining a highway it is essential that the road have a crown of very definite limitations. For comfort and safety in driving the crown should be as flat and uniform as possible. For durability of the road surface the crown should be as steep as possible in order to drain water off the road rapidly and to eliminate pools of water standing on the road which would cause rapid deterioration of the road surface.

Clay roads which are very susceptible to water damage should have as steep a crown as possible. However, for safe driving the crown should not be over one-half inch per foot. Concrete and bituminous roads on the other hand are more immune to water damage and a steep crown is not so essential. There must however be sufficient crown to drain off the water rapidly enough during freezing rains to keep icing at a minimum. To prevent such icing the crown of the road should be between one-eighth inch per foot and one-quarter inch per foot. Where the crown is being formed whether the slope be one-eighth inch or one-half inch per foot it is essential that such crown be maintained uniformly and it is highly desirable that variation in the crown slope for any given road be kept within one-eighth inch per foot.

For economy and quality of construction it is essential that the sub-grade of a road be graded to the same standard as the crown of a finished road. If the sub-grade is not uniform it will increase the amount of paving required to bring the finished road to a uniform crown, thus materially increasing the cost as all types of paving material are expensive. Further, if the paving is not uniform in thickness the paving material will compact more where it is thick than where it is thin, thus causing the uniform finish grade to become irregular under the compacting effects of traffic.

In addition to the matter of drainage and additional advantage of a uniform crown is riding qualities. A slight irregularity in the crown will, at present-day high speed of traffic, cause side-sway in the car, which is not only uncomfortable but also dangerous.

In the past, little effort has been made to construct or maintain clay or stone roads to a specific or uniform crown. Many such roads will vary from one inch per foot crown level, or even crowned in the wrong direction.

In the case of paved roads, steel forms have been used with the forms placed in proper elevation by means of a sighting instrument. This method is slow and expensive. Also the paver has previously relied on a straight edge and carpenter's level. With this method the operator of a road grader stops his machine at intervals and measures the crown of the road with a carpenter's level and straight edge. The operator then makes such corrections as is necessary. This method is also slow and expensive, and additionally is inaccurate, requiring skilled operators for a minimum of success.

The present invention has for its primary object to do away with reliance on such previous methods and to enable the construction or maintenance of a uniform crown on the road with the crown having a predetermined slope by means of an automatic blade angle control for the grading machine, enabling such construction or maintenance to be rapidly and economically carried out.

With reference to the drawings, Figure 1 illustrates a typical road grader to which the invention can be applied, the grader comprising a frame 1 carried on wheels 2 and supporting a cab 3 and driving engine 4.

Universally connected to the nose of the frame 1 as at 5 is a swivelled drawbar 6 having secured thereto a transverse channel member 7 within which, adjacent the ends thereof (see Figures 4 and 5), are pivotally connected the ends of pistons 8 of the hydraulic jacks 9 pivoted in brackets 10 pivoted to a transverse mount 11 carried by the machine frame 1.

Rotatably supported beneath the drawbar is a turntable 12 which carries a scraper blade 13 secured thereto by arms 14. An extensible side-shifting arm 15 is connected between the drawbar and machine frame enabling the drawbar to be held at the desired position laterally of the machine frame. While the jacks 9 provide a means of elevating or inclining the scraper blade, the rotation of the scraper blade may be effected through a suitable drive designated at 16 driving the turntable 12.

The details of such a machine as described are well known in the art and no claim therefore is made.

Figure 11:
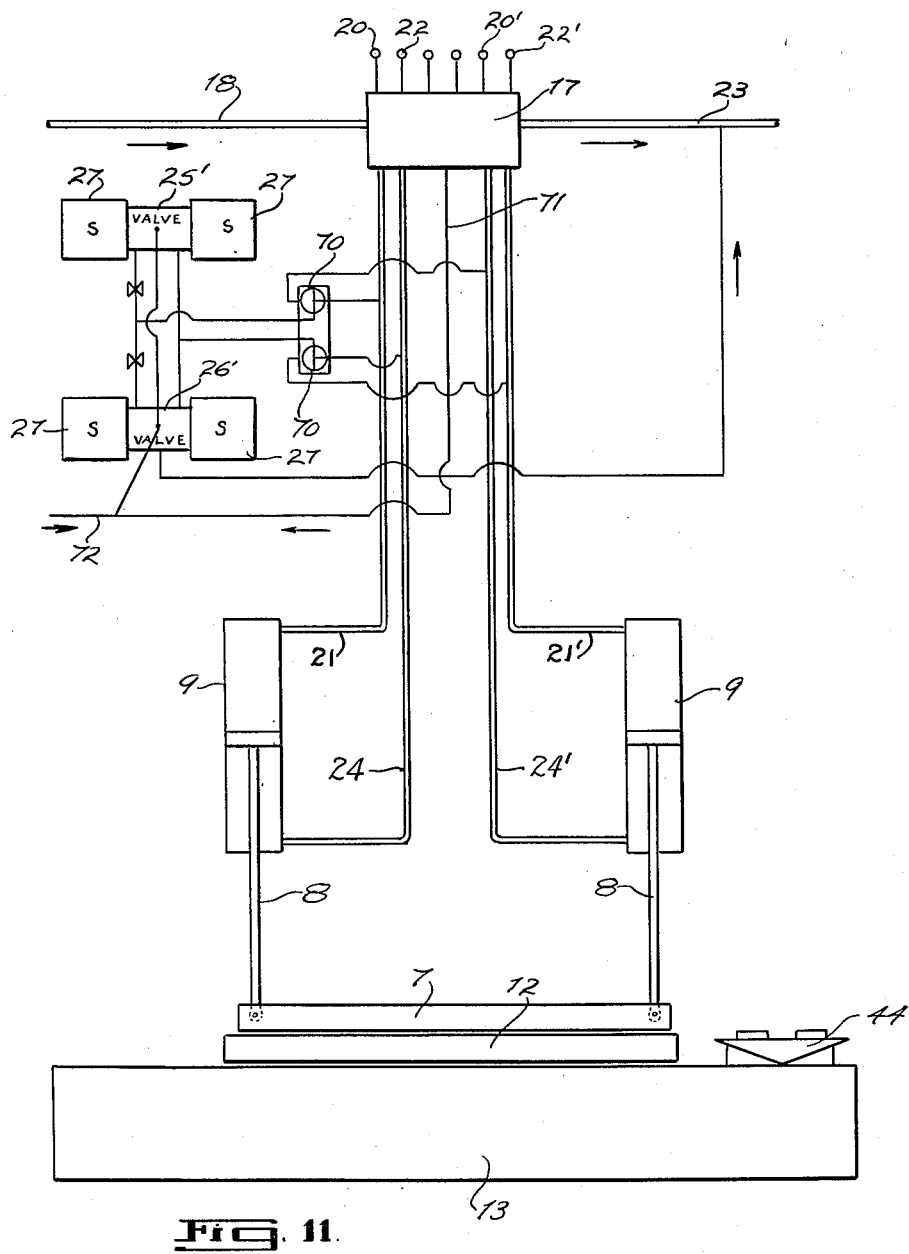
Figure 11 is the schematic diagram of an alternative hydraulic system to provide a blade control according to the present invention.

The operation of the jacks 9 on the present machine is controlled through a valve bank 17, Figures 6 and 11, to direct pressure oil from the line 18 into the jack cylinders as desired to operate the pistons 8, control 20 introducing pressure fluid through line 21 into the upper end of the left-hand jack 9, while control 22 enables pressure oil to be delivered to the bottom of the cylinder of the left-hand jack 9, the controls being such as to direct exhausted oil from the jack cylinder into the return line 23. The right-hand jack is similarly controlled through controls 20', 22', line 21' and line 24' similar to line 24 leading to the bottom of the left-hand jack.

Such a valve bank and control is standard equipment on the machine of the type illustrated and is shown herein principally in diagrammatic form and its operation will be well understood in the art.

The present invention provides for a blade angle responsive controlling mechanism to effect operation of the blade inclining power mechanism (herein comprising jacks 9) to maintain desired blade angle. To this end, with reference to Figure 6, incorporated into the hydraulic circuit of the jacks 9 in parallel with the manual valve bank 17 are valves 25 and 26 for operating the left and right-hand jacks respectively.

Figure 8:
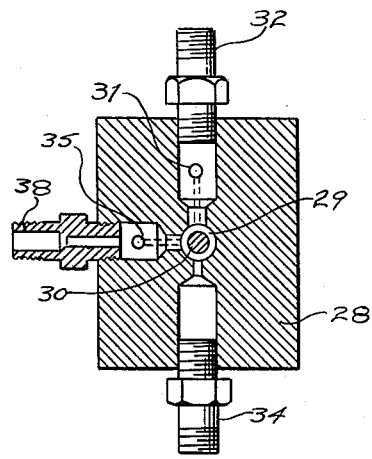
Figure 8 is a vertical section taken at right angles to Figure 7.
Figure 9:
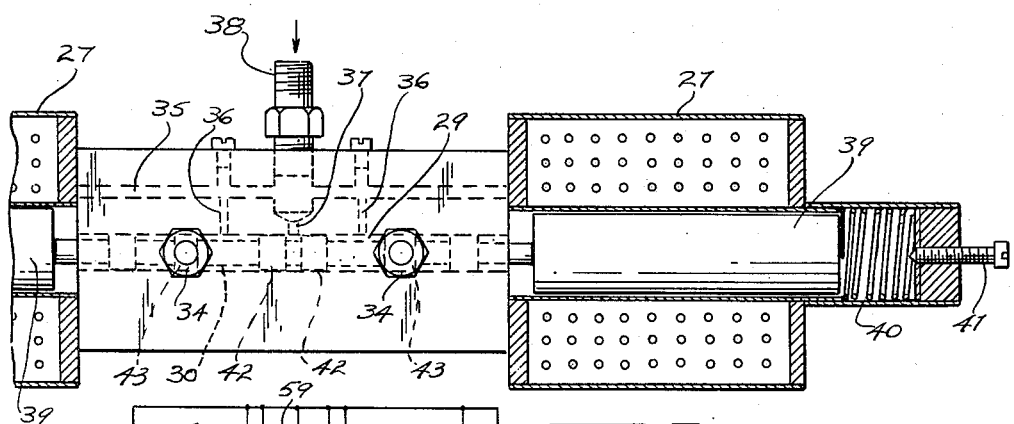
Figure 9 is a horizontal section taken through the mid-vertical of Figure 7 and showing details of one of the controlling solenoids.

With reference to Figures 7 to 9, each of the valves 25 and 26 are four-way valves operated by solenoids 27 and comprises a block 28 having a central bore 29 in which slides the valve member 30 actuated by the solenoids 27.

Parallel the bore 29 is a bore 31 which communicates with the outlet 32 and is in communication with the central bore 29 through lateral passages 33. Screws 34' close the ends of the bore 31 and lateral passages 33, providing for bleeding of the hydraulic system.

The outlets to the jacks indicated at 34 are also in communication with the central bore 29 inwardly of the lateral passages 33, as shown in Figure 7. A third bore 35 parallel and horizontally aligned with bore 29 is in communication with the central bore 29 through passages 36 and an intermediate passage 37 to deliver pressure oil from a hydraulic pump through the inlet 38 to the central bore 29 by the described passages 36 and 37.

The ends of the valve member 30 abut the plungers 39 of the solenoids 27 which are urged to assume the position of Figures 7 and 9 by springs 40 with the solenoids 27 de-energized. Screws 41 provide for adjustment of spring pressure.

With the valve in the inoperative position of Figures 7 and 9 the pressure oil through inlet 38 is directed to the central bore 29 through passage 37 between the valve flanges 42 and flows out through the outlet 32 to the reservoir of the hydraulic system. Meanwhile flanges 43 of the valve member seal the passages of the jack outlets 34.

With the valve shifted either left or right the central port 37 leading from the inlet will be closed by one of the flanges 42, while one of the flanges 43 will bar pressure oil flowing to the central bore through the passages 36 from communication with one of the jack outlets 34, while affording communication from this jack outlet through lateral passage 33 to the outlet 32, while the other flange 43 will move to provide communication for the pressure oil through passage 36 to the other jack outlet while closing the adjacent lateral passage 33 to the outlet bore 31.

The result is a four-way valve action allowing the pressure oil to circulate directly to the oil reservoir or through one of the jack outlets 32 to one end of the jack cylinder while affording communication for the exhaust oil from the other end of the jack cylinder through to the outlet 32 to operate the jack piston 8.

In the hydraulic system indicated at Figure 6 the valves 25 and 26 in parallel with the valve bank 17 are arranged to provide appreciably less flow than the flow permissible upon operation of the valve bank. The oil flow through the valves 25 and 26 may be of the order of one tenth to one twentieth of that permissible through the valve bank so that the valve bank control is dominating.

The operation of these valves 25 and 26 is through a control device mounted on the scraper blade 13 and responsive to change of blade inclination from a desired predetermined grading angle to control the valves 25 and 26 in a manner to restore the blade to the desired inclination.

The control device is in the form of a tilt sensitive switch mechanism 44 of the type described in my co-pending United States application Serial No. 150,625 filed March 20, 1950, now abandoned.

As shown in Figure 2, the switch device comprises two separate elements 45, one of which is detailed in Figure 3. It will be seen that each of the elements comprises a tube supported on spaced stirrups 46 threaded on rods 47 which permit the clamps 48 to secure the tube to its stirrups and force same downwardly against pressure of the springs 49.

The two tubes 45 are carried by a triangular bar 50 having an apex 51 about which the bar may be rocked as it is secured at the desired angle by the bolts 52 carried by the angle bar 53 mounted on the scraper blade 13.

Projecting within each of the tubes 45 are spaced electrodes 54 which are disclosed in detail in the said co-pending application and each comprising a carbon electrode 55 arranged within an insulating and protecting sleeve 56. Arranged within each of the tubes 45 is a body of mercury 57 of sufficient quantity to preferably normally partly bridge the gap between the electrodes 54 which are arranged at the ends of the tubes outwardly from the central locating stop 58 mounted on the bar 50 aligned as the right bisector of the apex 51.

The switch device is arranged so that with the scraper blade 13 inclined at the desired angle of tilt both of the switch elements 45 will be open circuited, that is, the mercury will not be in bridge between the adjacent electrodes. This adjustment can be readily obtained through rocking of the bar 50 about its apex and adjusting the mounting of the elements 45 in their stirrups 46.

Figure 10:
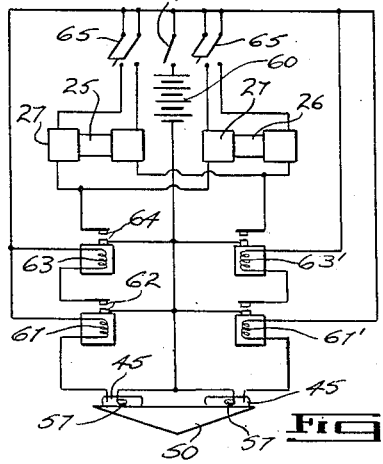
Figure 10 is a schematic diagram of the electric wiring of the control circuit.

Through the circuit connections illustrated in schematic form in Figure 10 tilting of the blade from its desired angle of incline to the left, causing the mercury body 57 in the left-hand side of the switch mechanism to bridge the electrodes 54, completes a circuit through the main switch 59, power supply 60 and left-hand switch element 45 to energize a sensitive relay 61 causing its normally open contacts 62 to close to energize the power relay 63 to close its contacts 64 to energize the left-hand solenoids 27 of the valves 25 and 26 with switches 65 connected in the solenoid circuits made.

The result of the operation of solenoids 27 is arranged to operate valves 25 and 26 so that pressure fluid flow through the hydraulic circuit above described will introduce pressure oil to the upper portion of one jack cylinder, while pressure oil is delivered to the bottom of the other jack cylinder to effect, through operation of the jacks 9, movement of the scraper blade in a direction to restore the blade to its desired angle of incline, and when the angle has been restored the left-hand element 45 will again be open-circuited, de-energizing the circuits of relays 62 and 63, de-energizing the left-hand solenoids 27 of the valves 25 and 26, which valves are operated under action of the springs 40 to shut off oil flow to the jacks.

If the blade should tilt in the opposite direction the right-hand section or element 45 of the switch mechanism will close, energizing the right-hand relays 61' and 63' corresponding to relays 61 and 63 to operate the jacks 9 in reverse to the operation afforded through energizing relays 61 and 63 through operating the valves 25 and 26 under energization of the right-hand solenoids 27 of the valves to again restore the blade to its desired angle of incline.

As pointed out above, the valves 25 and 26 are arranged to afford relatively slow blade movement for refined control as compared to blade movement effected by operation of the over-riding valves of the bank 17.

By providing a switch device of the type disclosed a very sensitive response to variations in tilt is obtainable and at the same time the switch is essentially surge-proof to prevent oscillation of the blade about the desired inclination.

Additionally, it will be appreciated that the switch mechanism must be vibration-proof to withstand the severe and violent vibration of the scraper blade upon operation of the machine.

The present described switch has this important characteristic of withstanding vibration under actual field conditions. For dependability and accuracy it is essential that the switch device 44 be directly on the blade for if mounted elsewhere it would be undependable due to the flexibility of the machine frame and blade supports.

To give a ready indication to the machine operator of the inclination of his blade a visual indicator device 66 is mounted above the switch mechanism 44. This visual indicator 66 is preferably a device of the type disclosed in my copending United States application Serial Number 95,678 filed May 27, 1949, now Patent No. 2,611,181 granted September 23, 1952, as shown in Figure 2, and includes a body of mercury 67 moving in an arcuate tube 68, which mercury may be rendered clearly visible by any suitable means so that its position on a scale 69 may be determined or alternately the mercury may be utilized to close successive contacts to energize electrical circuits as desired, as taught in my co-pending application Number 95,678.

The above hydraulic circuit of Figure 6 and electrical circuit of Figure 10 have been described with respect to controlling the two jacks 9 simultaneously. The control system according to the present invention is equally applicable to maintaining blade inclination through operation of one of the jacks 9 by itself.

Figure 11 shows an alternative form of hydraulic circuit in which valves 25' and 26', similar to valves 25 and 26 and operated by solenoids 27, are connected through three-way valves 70 to operate either the left-hand or right-hand jack 9 as selected by the valves 70.

In the particular hydraulic circuit disclosed the two valves 25' and 26' are utilized with one valve having a substantially higher flow rate capacity than the other and being arranged, as will be presently described with reference to Figure 12, to cut in after opening of the valve of lesser flow rate and to cut out before the valve of lesser flow rate capacity to provide refined blade movement with the blade immediately adjacent its desired angle of incline, and to provide relatively speedier blade movement upon a blade being tilted a slightly further distance from its desired angle of incline.

In the diagram of Figure 11 the valves 25' and 26' are shown in parallel with each other and with the valve bank 17, with the valve 25' being of lesser capacity than the valve 26' to provide refined blade movement with the blade adjacent desired angle, as above described.

With the valves 70 in their position illustrated the valves 25' and 26' are connected to operate the left-hand jack 9.

Like the hydraulic circuit of Figure 6 pressure oil may be delivered as desired through one of the valves of the bank 17 and feed line 71, or may be obtained from a separate small capacity pump delivering through the auxiliary feed line 72.

To provide the desired operation of solenoids 25' and 26' the switch mechanism 44 is somewhat modified from the showing of Figures 2 and 3 to include three electrodes 54 with movement of the switch under tilt to initially close for one direction of tilt the circuit including relay 73 to energize relay 74 which closes the circuit to the left-hand solenoid 27 of the refined valve 25'.

A further tilting of the switch mechanism 44 will close the circuit through relay 75, energizing power relay 76 to operate, through the left-hand solenoid 27, the coarse valve 26'. Reversal of tilt of the switch mechanism 44 will similarly first operate valve 25' through the sensitive relay 73' and power relay 74', and then for further variation of blade movement from the desired position of incline will subsequently operate the right-hand solenoid 27 and valve 26' through the sensitive relay 75' and power relay 76'.

Thus it will be seen that the valve 25' is first opened to provide relatively small blade movement with the coarse valve 26' cutting in later to increase the blade movement to effect return of the blade to desired inclination at a greater speed.

Likewise it will be apparent that the relays operating the solenoids of 26' will cut out first as the blade nears desired inclination to allow valve 25' to restore the blade to the desired inclination with a refined blade movement prohibiting blade oscillation. Alternative to the three-electrode switch element of Figure 12, two two-electrode switch elements may be used where wider range of adjustment for more flexible operation is required.

The above automatic blade control has been described with reference to one particular hydraulic system which is common among grading machines. However, it will be appreciated that the present invention may be extended to control, not only other hydraulic blade operating devices but also may be extended to electrical or other power blade controls.

It will also be understood that the present automatic blade control, in addition to providing accurate grading automatically, enables the operator to control the blade through the large capacity valves of the bank 17 without regard to the functioning of the automatic controls. Grading can be carried out therefore by a relatively unskilled operator with better results than can be now obtained with experienced personnel, and particularly with the control as shown in Figures 11 and 12 grading can proceed at a much faster rate.

The function performed by the device of the present invention will be more clearly appreciated with reference to Figures 4 and 5. Figure 4 shows the machine frame 1 in dotted line with the left-hand wheel on the ground, and shows in solid line the position of the frame as the left-hand wheel is elevated in passing over some obstruction.

To meet this new condition the automatic blade control above described is immediately sensitive through switch mechanism 44 to the change in the points of support of the jacks 9 and operates to extend the piston of the left-hand jack 9 downwardly an amount corresponding to the upward movement of the left-hand wheel so that the blade angle is maintained constant.

Figure 5 shows the frame 1 twisted to an opposite angle, changing the points of support of the jacks 9 and illustrating the manner in which the jacks have been operated through functioning of the switch mechanism 44 and control means operated thereby to maintain constant blade angle.

While one particular form of switch mechanism has been illustrated it will be appreciated that the concepts of the invention envisage any suitable form of tilt-sensitive blade control.

What I claim as my invention is:

1. In a grading machine having a vehicle frame, a scraper blade suspended therefrom for tilting movement and a power-operated mechanism for tilting said blade to the desired position of incline; electrically-operated control means for said power-operated mechanism providing refined blade movement, electrically-operated control means for said power-operating mechanism providing coarse blade movement, control circuits for each of said electrically operated control means, and switch means sensitive to tilt mounted on said blade and governing said control circuit energization to maintain said control means free of control of said power-operated mechanism with said blade at a desired angle of incline and upon movement of said blade from a desired angle of incline operating said control means through said control circuits to effect movement of said blade to restore said blade to said desired angle of inclination, said switch means being constituted to effect blade movement principally through said coarse control means with said blade at an appreciable deviation of inclination from desired angle of tilt and solely through said fine control means with said blade immediately adjacent said desired angle of inclination.

2. In a road grader carrying a tiltable scraper blade and having a pair of hydraulic jacks supporting said blade adjacent the ends thereof and operating said blade to incline, and main control valves for operating said hydraulic jacks; solenoid-operated auxiliary valve means connected in the hydraulic circuit in at least one of said jacks to operate one end of said blade to change blade incline, a tilt-sensitive electrical control device, and means mounting said tilt-sensitive device on said blade for tilt adjustment with respect to said blade, said tilt-sensitive device being electrically connected to operate said auxiliary valve means and having a neutral position of tilt in which said blade is held stationary and being adapted upon tilting either side of said neutral position to effect blade movement through said auxiliary valve means to restore said tilt-sensitive device to said neutral position, said mounting means providing for adjustment of said tilt-sensitive device to said neutral position with said blade at desired angle of incline.

3. A device as claimed in claim 2 in which said auxiliary valve means provides lesser flow capacity than said main control valves whereby said main control valves are dominating.

4. In a road grader carrying a tiltable scraper blade and having a pair of hydraulic jacks supporting said blade adjacent the ends thereof and operating said blade to incline, and main control valve for operating said hydraulic jacks; a four-way solenoid-operated auxiliary valve hydraulically connected in the hydraulic system of at least one of said jacks in parallel with the main control valves therefor, a tilt-sensitive control device, and means mounting said tilt-sensitive control device for tilting adjustment with respect to said blade, said tilt-sensitive device being electrically connected to operate said four-way valve and having a neutral position of tilt in which said four-way valve closes fluid flow therethrough to said jack, and being adapted upon tilting either side of said neutral position to operate said four-way valve to operate said jack to effect blade movement to restore said tilt-sensitive device to said neutral position, said mounting means providing for adjusting said tilt-sensitive device to said neutral position with said blade at a desired angle of incline.

5. A device as claimed in claim 4 in which a second four-way solenoid-operated auxiliary valve is connected in parallel with said first-mentioned four-way valve, and said tilt-sensitive electrical control device is connected to energize said second four-way auxiliary valve during further deviation of said blade from desired angle of incline, said second-mentioned valve having a larger flow capacity than said first-mentioned auxiliary valve.

6. A device as claimed in claim 4 in which valve means are provided to selectively connect said auxiliary valve in the hydraulic system of either of said hydraulic jacks.

7. In a grading machine having a vehicle frame suspended therefrom for tilting movement and a power operated mechanism for tilting said blade to the desired position of incline; electrically operated control means for energizing said power operated mechanism for varied rate of blade movement according to the degree of deviation of said blade from desired position of incline, control circuit means for energizing said electrically operated control means, and switch means sensitive to tilt mounted on said blade and governing said electrically operated control means through said control circuit means to provide relatively coarse blade movement with said blade at an appreciable deviation from desired angle of inclination and relatively fine blade movement with said blade immediately adjacent said desired angle of inclination.

8. In a road grader carrying a tiltable scraper blade and a hydraulic circuit including hydraulic jack means for operating said blade to incline and main control valves for operating said hydraulic jack means; solenoid-operated auxiliary valve means connected in said hydraulic circuit to operate said blade to change blade incline, and a tilt-sensitive electrical control device electrically connected to operate said auxiliary valve means and having a neutral position of tilt in which said blade is held stationary and being adapted upon tilting either side of said neutral position to effect blade movement through said auxiliary valve means to restore said tilt-sensitive device to said neutral position.

9. In a road grader, a tiltable scraper blade, power operated means for operating said blade to incline, main control means for controlling said power operated means to change blade incline, auxiliary secondary control means dominated by said main control means for controlling said power operated means to change blade incline, and a tilt-sensitive control device governing said auxiliary control means and having a neutral position of tilt in which said blade is held stationary and being adapted upon tilting either side of said neutral position to effect blade movement through said auxiliary control means to restore said tilt-sensitive device to said neutral position.

FRANK VICTOR BELL.

References Cited in the file of this patent

UNITED STATES PATENTS

| Number | Name | Date |
|---|---|---|
| 705,731 | Ach | July 29, 1902 |
| 2,268,017 | Busick et al. | Dec. 30, 1941 |
| 2,278,081 | Kramer | Mar. 31, 1942 |
| 2,284,550 | Adams | May 26, 1942 |
| 2,359,961 | Anthony | Oct. 10, 1944 |
| 2,520,266 | Adams | Aug. 29, 1950 |
| 2,572,910 | Brown | Oct. 30, 1951 |